United States Patent
Chi et al.

(10) Patent No.: US 9,209,896 B2
(45) Date of Patent: Dec. 8, 2015

(54) ACTIVE NETWORK MONITORING SYSTEM AND METHOD THEREOF

(71) Applicant: National Taiwan University of Science and Technology, Taipei (TW)

(72) Inventors: Chang-Chia Chi, Taipei (TW); Chen-Wen Tarn, Taipei (TW); Hong-Mao Lin, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 13/941,855

(22) Filed: Jul. 15, 2013

(65) Prior Publication Data

US 2014/0119724 A1    May 1, 2014

(30) Foreign Application Priority Data

Nov. 1, 2012 (TW) .............................. 101140517 A (51) Int. Cl.
H04B 17/00 (2015.01)
H04B 10/071 (2013.01)

(52) U.S. Cl.
CPC .................................... H04B 10/071 (2013.01)

(58) Field of Classification Search
CPC .................................................. H04B 10/071
USPC ........... 398/21, 33, 35, 72, 67, 70, 71, 66, 58, 398/30, 16, 17, 20
See application file for complete search history.

(56) References Cited

U.S. PATENT DOCUMENTS

| | | | | |
|---|---|---|---|---|
| 5,349,462 A | * | 9/1994 | Defranco et al. | 398/138 |
| 6,310,702 B1 | * | 10/2001 | Minami et al. | 398/13 |
| 8,693,866 B1 | * | 4/2014 | Lam et al. | 398/21 |
| 8,861,952 B2 | * | 10/2014 | Cole et al. | 398/5 |
| 8,917,987 B2 | * | 12/2014 | Wen et al. | 398/16 |
| 9,020,349 B2 | * | 4/2015 | Chen et al. | 398/68 |
| 2002/0114591 A1 | * | 8/2002 | Brezina et al. | 385/89 |
| 2004/0052450 A1 | * | 3/2004 | Morrison | 385/24 |
| 2004/0052477 A1 | * | 3/2004 | Morrison | 385/88 |
| 2007/0116467 A1 | * | 5/2007 | Kwon et al. | 398/72 |
| 2008/0123085 A1 | * | 5/2008 | Sikora et al. | 356/73.1 |
| 2008/0166119 A1 | * | 7/2008 | Ryu et al. | 398/17 |
| 2008/0292314 A1 | * | 11/2008 | Lu | 398/58 |

(Continued)

FOREIGN PATENT DOCUMENTS

WO    WO 2013055105 A1 *   4/2013

*Primary Examiner* — Ken Vanderpuye
*Assistant Examiner* — Amritbir Sandhu
(74) *Attorney, Agent, or Firm* — Bacon & Thomas, PLLC (57) ABSTRACT

An active network monitoring system for detecting an abnormality at a position between a communication office and a client includes a first monitoring module disposed on the communication office, a second monitoring module disposed on the client and an optical splitter. The first monitoring module has a first processor and a first laser diode. The second monitoring module has a second processor and a second laser diode. The first processor sends a digital signal to the first laser diode. The first laser diode modulates the digital signal into an optical signal and sends the optical signal to the second monitoring module via the optical splitter. The second laser diode converts the optical signal back to the digital signal, and sends the digital signal to the second processor to generate an identification signal of the client. The identification signal is transmitted to the communication office via the second laser diode.

5 Claims, 7 Drawing Sheets

(56) References Cited

U.S. PATENT DOCUMENTS

| | | | |
|---|---|---|---|
| 2009/0190921 A1* | 7/2009 | Nakajima et al. | 398/13 |
| 2009/0196598 A1* | 8/2009 | Duan et al. | 398/5 |
| 2011/0013904 A1* | 1/2011 | Khermosh et al. | 398/16 |
| 2011/0103792 A1* | 5/2011 | Kimura | 398/2 |
| 2012/0039598 A1* | 2/2012 | Dahlfort | 398/13 |
| 2013/0188947 A1* | 7/2013 | Lee et al. | 398/13 |
| 2013/0223838 A1* | 8/2013 | Horishita et al. | 398/13 |
| 2014/0003806 A1* | 1/2014 | Urban et al. | 398/21 |
| 2014/0147109 A1* | 5/2014 | Urban et al. | 398/20 |
| 2014/0193147 A1* | 7/2014 | Smith | 398/16 |
| 2014/0205279 A1* | 7/2014 | Lee et al. | 398/21 |
| 2014/0212130 A1* | 7/2014 | Urban et al. | 398/13 |
| 2014/0212131 A1* | 7/2014 | Zhang | 398/16 |
| 2015/0023658 A1* | 1/2015 | Vilela De Faria et al. | 398/21 |
| 2015/0188626 A1* | 7/2015 | Viswanathan | |

\* cited by examiner

ACTIVE NETWORK MONITORING SYSTEM AND METHOD THEREOF

BACKGROUND OF THE INVENTION (1) Field of the Invention

The invention relates to an network monitoring system, and especially relates to an active network monitoring system and the method thereof.

(2) Description of the Prior Art

With the growth of the global Internet, the communications diversification, and the increasing construction of global telecommunications market, the traffic increase rapidly, so that the network architecture and protocol of the passive optical network (PON), the point-to-multipoint (P2MP) and the fiber to the home (FTTH) have become the best choice for high-speed fiber-optic access network. The feature of the passive optical network is that can be done without power, like a mirror at home, reflective image without electricity. In addition to the optical line terminal equipment need electricity, that is based on optical fiber to complete the transfer.

However, most of the passive optical network techniques of the detecting optical fiber breakpoint position use the optical time domain reflectometer (OTDR). When the passive optical network detecting the optical fiber breakpoint, it need to use a lot of fiber brag grating filter (FBG), optical circulator, tunable laser light source and other optical elements. Due to the high cost of the optical element, the detecting method of the passive optical network is difficult to commercial in the large number provision.

Therefore, we need to design an active detecting monitoring module for the optical network, which can reduce the use of the optical elements and significantly reduce the cost of the entire optical network.

SUMMARY OF THE INVENTION

Accordingly, the object of the invention is to provide an network monitoring system and an active network monitoring method using the cheap single chip and the laser diode to replace the high cost optical element, thereby substantially reducing costs.

In one aspect, the invention provides an active network monitoring system. The active network monitoring system is used to detect an abnormality at a position between the optical line terminal of communication office and the optical network unit of the client. The active network monitoring system includes a first monitoring module, an optical splitter and a second monitoring module. The first monitoring module is disposed at the is communication office and has a first processor, a first laser diode and an optical time domain reflectometer. The first laser diode and the optical time domain reflectometer are connected to the first processor. The optical splitter has a receiving end and a transmitting end, the receiving end is connected to the first monitoring module. The second monitoring module is disposed at the client and has a second processor and a second laser diode. The second laser diode is connected to the second processor, and the second monitoring module is connected to the transmitting end of the optical splitter.

In an embodiment, the communication office and the receiving end of the optical splitter are connected by an optical fiber.

In another embodiment, the client and the transmitting end of the optical splitter are connected by an optical fiber.

In another embodiment, the first processor and the second processor are respectively eight-bit single chips.

In another embodiment, the active network monitoring system further includes a first wavelength division multiplexer and a second wavelength division multiplexer, the first wavelength division multiplexer is disposed between the communication office and the receiving end of the optical splitter, and the second wavelength division multiplexer is disposed between the transmitting end of the optical splitter and the client.

In another embodiment, the first monitoring module has a display for displaying the results of the active network monitoring system.

In another aspect, the invention provides an active network monitoring method suitable for the abovementioned active network monitor system, the method comprises the following steps: the first processor generating a digital signal and sending the digital signal to the first laser is diode; the first laser diode modulating the digital signal into an optical signal and send the optical signal to the second monitoring module via the optical splitter; the second laser diode receiving the optical signal and converting the optical signal back to the digital signal, and then sending the digital signal to the second processor; the second processor producing an identification signal of the client, and sending the identification signal back to the second laser diode, then the second laser diode converting the identification signal back to the optical signal and transmitting the optical signal to the communication office.

In another embodiment, the active network monitoring method further include the step: the second laser diode providing a plurality of optical signals and transmits the optical signals to the communication office. Between each optical signal and its previous one optical signal has a time interval, and the plurality of the time intervals are the same.

In another embodiment, the active network monitoring method further include the step: providing a plurality of second monitoring modules, wherein the first monitoring module monitors on each second monitoring modules in turns.

In another embodiment, the active network monitoring system further include: the first monitoring module transmitting the optical signal to the abnormality at a position; the display displaying the active network monitoring system has an abnormal position as the communication office confirming that the identification signal transmitted back by the client has not been received; the first processor transmitting a control signal to drive the optical time domain reflectometer to transmit an optical pulse signal to the abnormal position.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the figure(s) being described.

The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
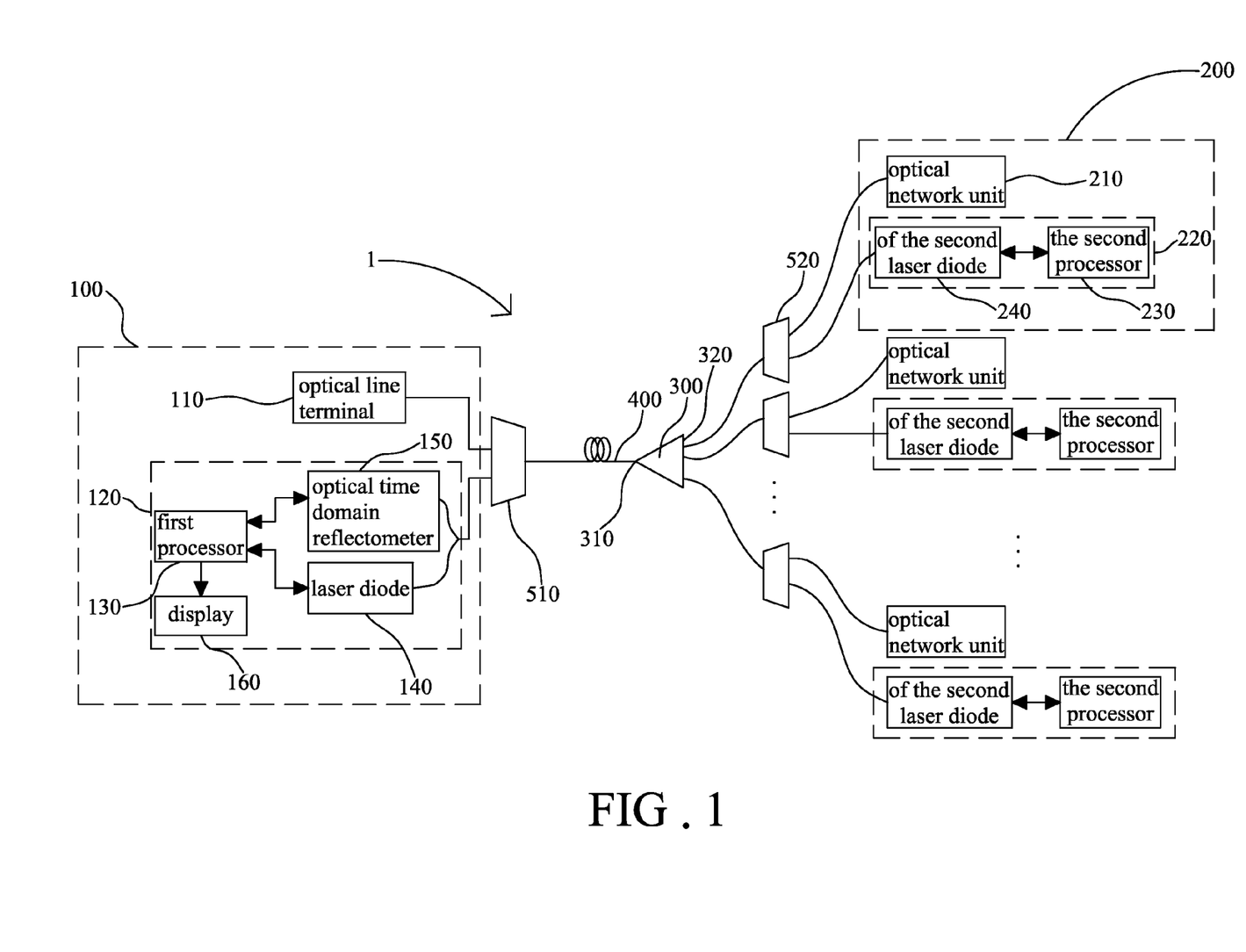
FIG. 1 is one embodiment of the active network monitoring system of the present invention.

Refer to FIG. 1, it is an active network monitoring system 1 in present invention. The active network monitoring system 1 is used to detect an abnormality at a position between an optical line terminal 110 of a communication office 100 and an optical network unit 210 of a client 200. The active network monitoring system 1 includes a first monitoring module 120, an optical splitter 300 and a second monitoring module 220. The first monitoring module 120 is disposed at the communication office 100 and has is a first processor 130, a first laser diode 140 and an optical time domain reflectometer 150. The first laser diode 140 and the optical time domain reflectometer 150 are connected to the first processor 130. The optical splitter 300 has a receiving end 310 and a transmitting end 320, the receiving end 310 is connected to the first monitoring module 120. The second monitoring module 220 is disposed at the client 200 and has a second processor 230 and a second laser diode 240. The second laser diode 240 is connected to the second processor 230, and the second monitoring module 220 is connected to the transmitting end 320 of the optical splitter 300.

Please continually refer to FIG. 1, it is connected by an optical fiber 400 between the communication office 100 of the active network monitoring system 1 and the receiving end 310 of the optical splitter 300. It is also connected by the optical fiber 400 between the client 200 and the transmitting end 320 of the optical splitter 300. The active network monitoring system 1 also includes a first wavelength division multiplexer 510, which is disposed between the communication office 100 and the receiving end 310 of the optical splitter 300. The first wavelength division multiplexer 510 is connected to the optical line terminal 110 and the first monitoring module 120, and make the optical signal provided by the optical line terminal 110 and the first monitoring module 120 import to an optical fiber 400; and with the reverse direction, the first wavelength division multiplexer 510 restores the optical signal with different wavelengths in same optical fiber 400, and sends the restored optical signal to the optical line terminal 110 and the first monitoring module 120. The active network monitoring system 1 also includes a second wavelength division multiplexer 520, which is disposed between the optical network unit 200 and the transmitting end 320 of the optical splitter 300. The second wavelength division multiplexer 520 is connected to the optical network unit 210 and the second monitoring module 220, and make the optical signal with different wavelengths in the optical fiber 400 transmit to the optical network unit 210 and the second monitoring module 220; and with the reverse direction, the second wavelength division multiplexer 520 imports the optical signal provided by the optical network unit 210 and the second monitoring module 220 to the optical fiber 400. Besides, the active network monitoring system 1 has a display 160, which is used to display the monitoring results of the active network monitoring system.

Figure 2:
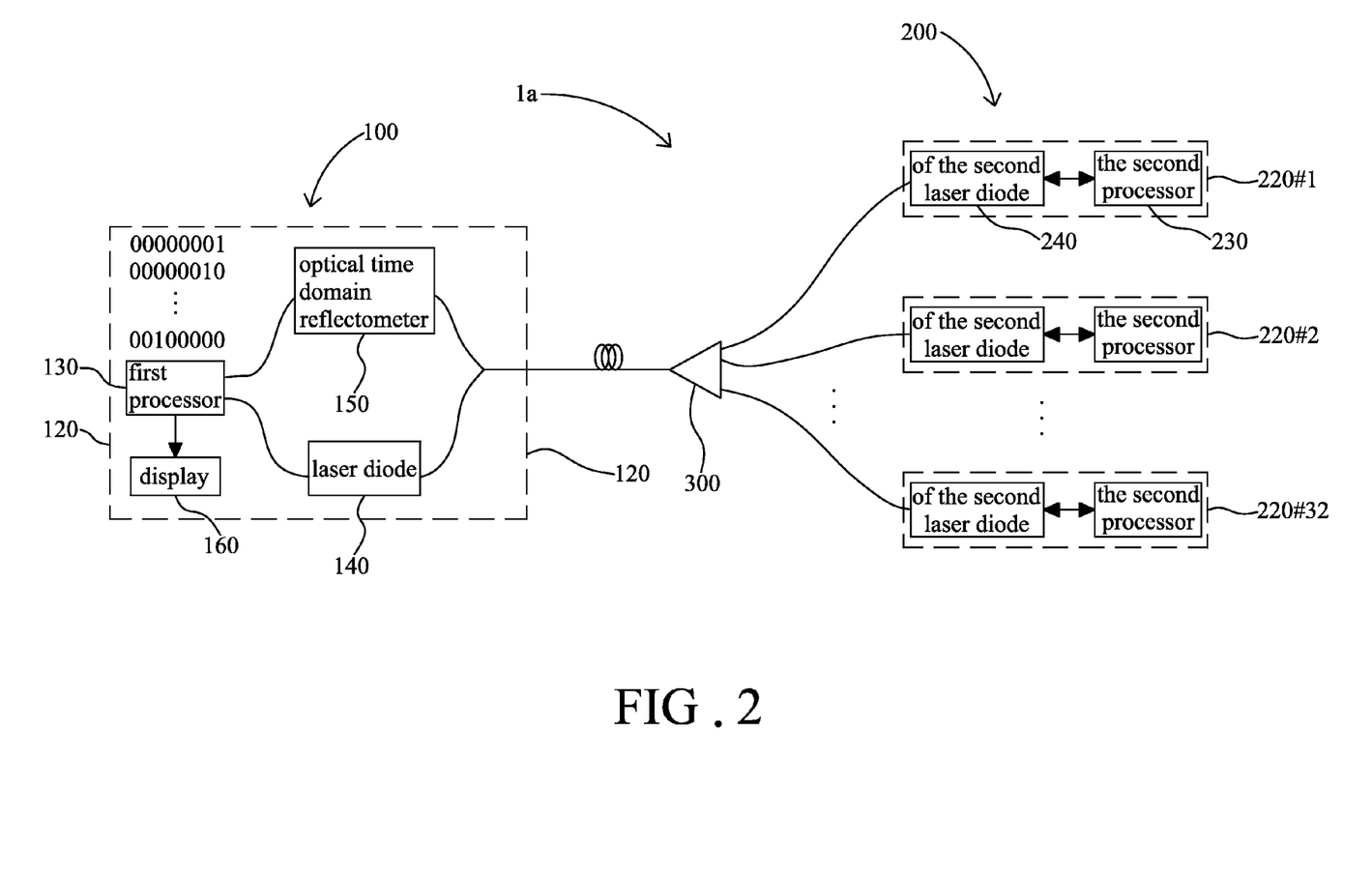
FIG. 2 is one embodiment of the active network monitoring system of the present invention. of the present invention.

Refer to FIG. 2, it is the active network monitoring system 1a of the present invention. The active network monitoring system 1a has a first monitor module 120, thirty-two second monitoring modules (220 # 1 to 220 # 32), and an optical splitter 300. The optical splitter 300 has a receiving end 310 and thirty-two transmitting ends 320, these transmitting ends 320 are corresponding to each of the second monitoring modules 220. The first processor 130 and the second processor 230 may be a 8051 single wafer. The first laser diode 140 and the second laser diode 240 may be a two-way narrowband Fabry-Perot laser diode, which has a transmitting and receiving effect; and, the wavelength of the optical signal provided by the laser diodes 140,240, and the wavelength of the optical pulse signal provided by the optical time domain reflectometer are preferably between the range of 1600-1650 nm.

Figure 3:
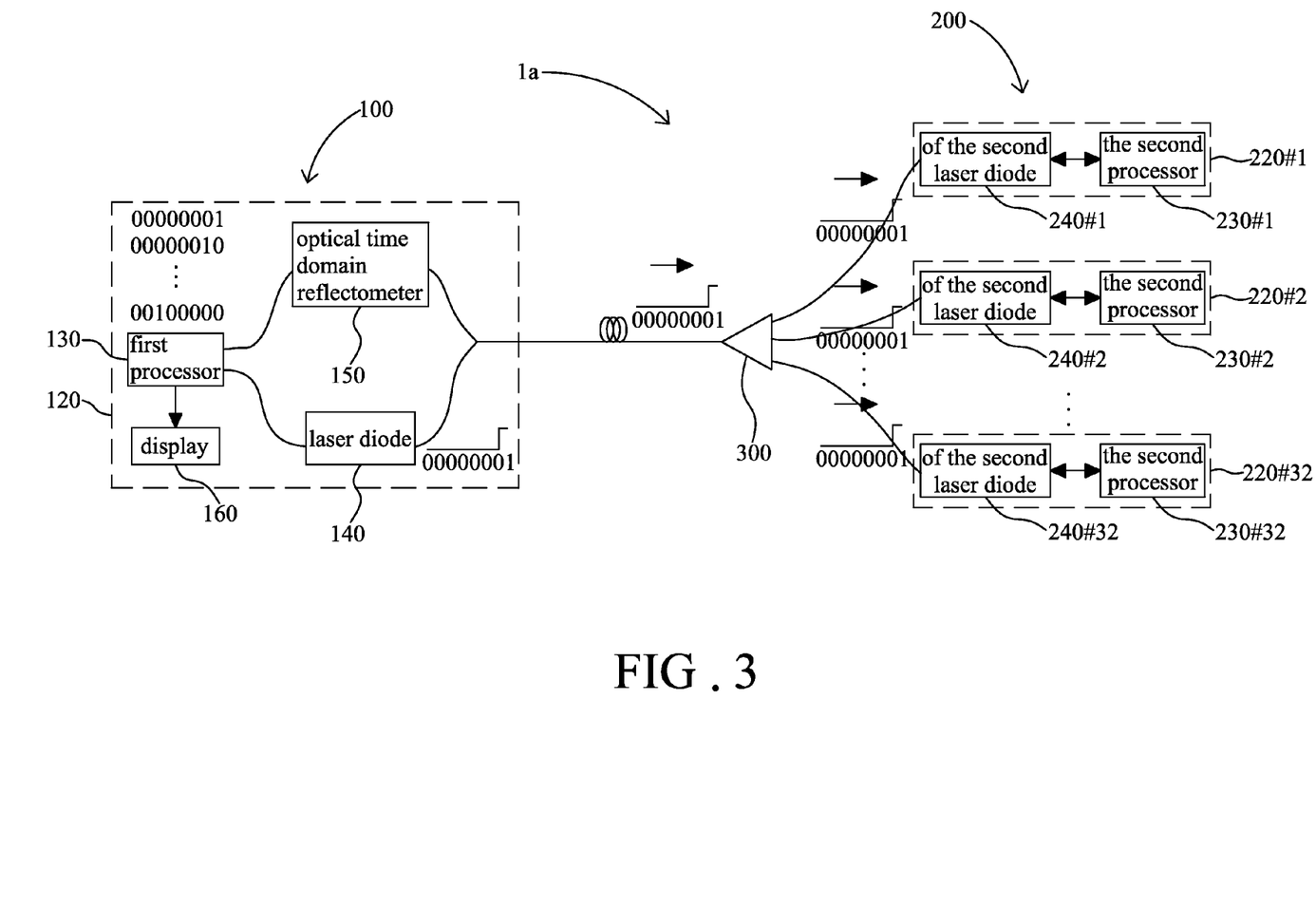
FIG. 3 to FIG. 6 are the active network monitoring method of the present invention.
Figure 4:
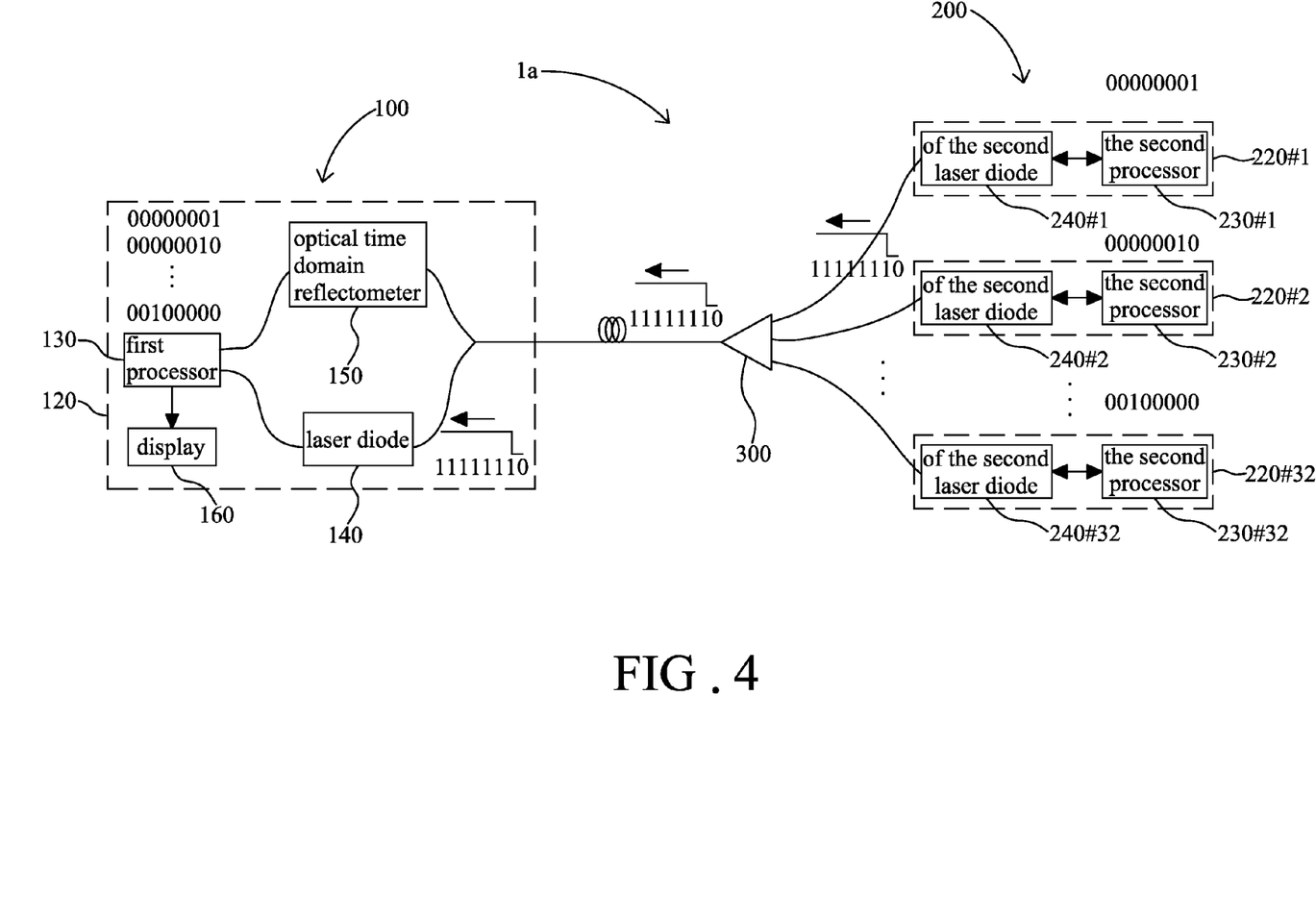

Refer to FIG. 3 and FIG. 4, it is the active network monitoring method (S1) of the present invention. The active network monitoring method of the present invention (S1) provides an above-described active network monitoring system 1a, and the active network monitoring method (S1) includes the following steps:

Step (S110): The first processor 130 of the first monitoring module 120 generates an 8-bit digital signal 00000001, and sends the digital signal 00000001 to the first laser diode 140.

Step (S120): The first laser diode 140 modulates the digital signal 00000001 into an optical signal, and transmits the optical signal 00000001 to each second monitoring module (220 # 1 to 220 # 32) through the optical fiber 400 and the optical splitter 300.

Step (S130): At this point, only the second laser diode 240 # 1 of the second monitor module 220 # 1 may receive the optical signal, and the second laser diode 240 # 1 converts the optical signal back to the digital signal 00000001 and sends the digital signal to the second processor 230 # 1.

Step (S140): The second processor 230 # 1 produces an identification signal 11111110 of the second monitoring module 220 # 1, and transmits the identification signal 11111110 back to the second laser diode 240 # 1; the second laser the diode 240 # 1 may convert the identification signal 11111110 back to the optical signal and return to the first monitoring module 120, thus making the communication office 100 confirm connection of the optical fiber 400 is normal between the first monitoring module 120 and the second monitoring module 220 # 1.

Step (S150): The first processor 130 of the first monitoring module 120 generates an 8-bit digital signal 00000010 and sends the digital signal 00000010 to the first laser diode 140, and then repeat steps (S110) to (S140).

The active network monitoring (S1) detects each the second monitoring module (220 # 1 to 220 # 32) of the client 200 in turn by the first monitoring module 120 of the communication office 100, so the active network monitoring method (S1) is referred to as the One-by-One monitoring method.

Figure 5:
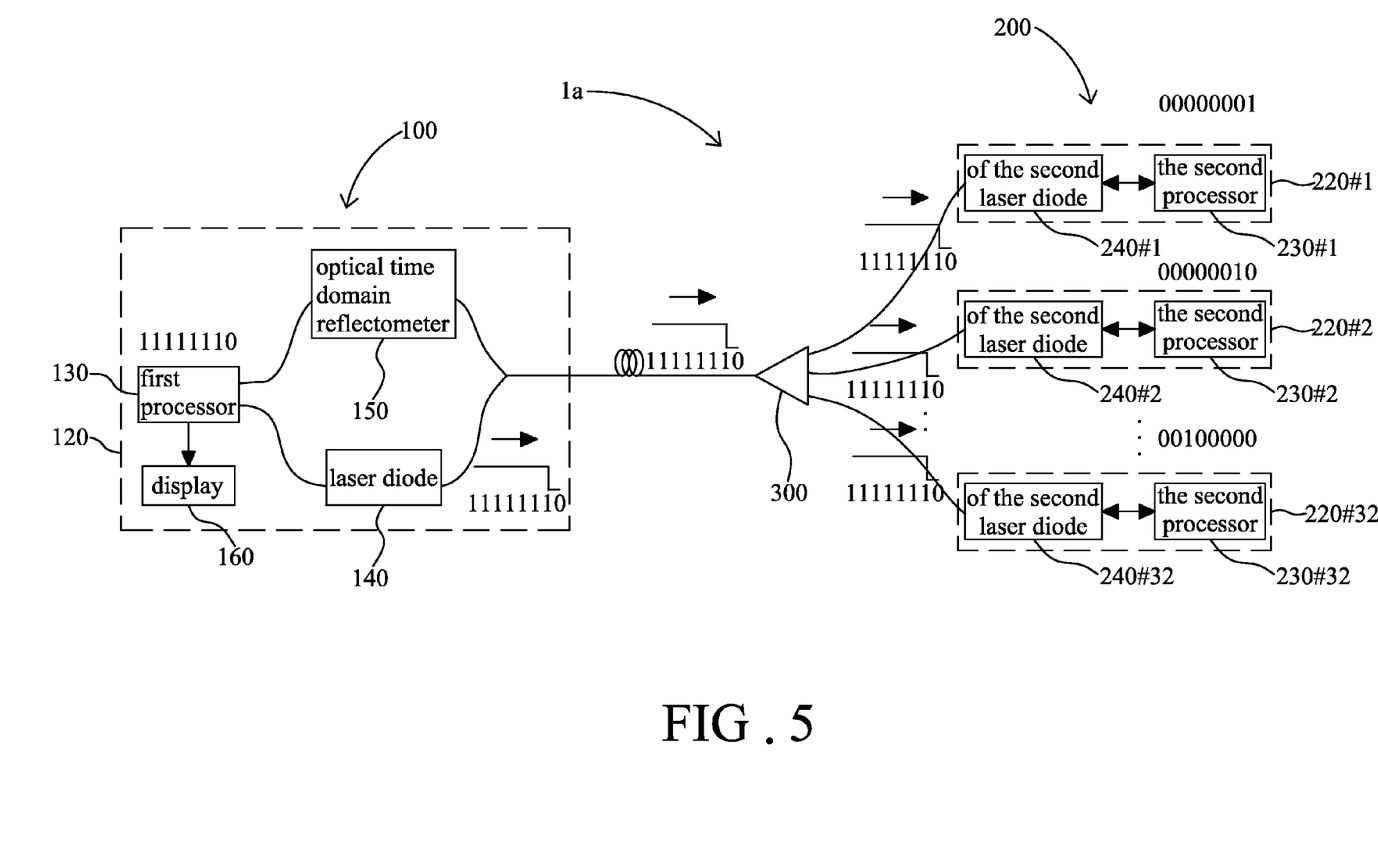
Figure 6:
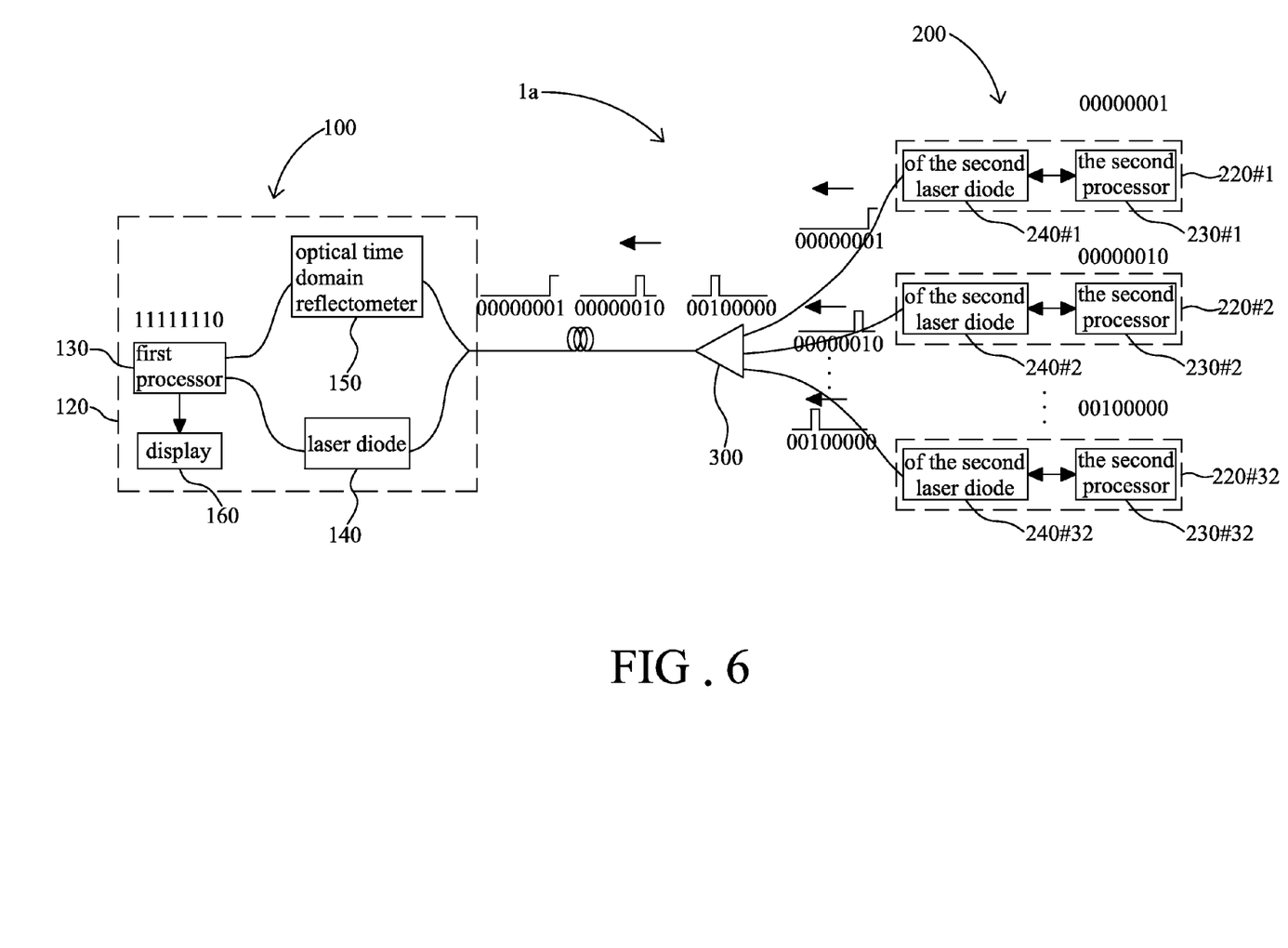

Refer to FIG. 5 and FIG. 6, it is the active network monitoring method (S2) of the present invention. The active network monitoring method (S2) provides the active network monitoring system 1a, while the optical line terminal 110 assigns the identification number (ID number) to each optical network unit 210, and set an identification code to each monitoring module (220 # 1 to 220 # 32). The active network monitoring method (S2) includes the following steps:

Step (S210): The first processor 130 of the first monitoring module 120 produces an 8-bit digital signal 11111110 and sends the digital signal 11111110 to the first laser diode 140.

Step (S220): The first laser diode 140 modulates the digital signal 11111110 into an optical signal and transmits the optical signal 11111110 to each monitoring module (220 # 1 to 220 # 32) through the optical fiber 400 and the optical splitter 300.

Step (S230): Each processor (230 # 1 to 230 # 32) generates a 8-bit identification signal according to the set ID number and transmit the identification signal to the second laser diode (240 # 1 to 240 # 32).

Step (S240): The second laser diode (240 1 # to 240 # 32) modulate the identification signal into the optical signal, and transmit the optical signal back to the first monitoring module 120 in accordance with the order of the ID number. Between each optical signal and its previous one optical signal has a return time interval, all the return time intervals are 0.005 seconds. The corresponding ID number of the second monitoring module 220 and the return time interval can refer to chart (1).

CHART (1)

| the second monitoring module | ID number | return time interval |
|---|---|---|
| 220#1 | 00000001 | 0.005 |
| 220#2 | 00000010 | 2 × 0.005 |
| . | . | . |
| . | . | . |
| . | . | . |
| 220#32 | 00100000 | 32 × 0.005 |

Step (S250): After the first monitoring module 120 receive 32 group identification codes in sequence, the communication office 100 confirms that the optical fiber 400 connection is normal between the first monitoring module 120 and each of the second monitoring modules (220 # 1 to 220 # 32).

The active network monitoring (S2) make each optical signal wait a same time interval in transmission, so that each optical signal does not interfere with each other that makes it difficult to recognize. Therefore, the active network monitoring method (S2) is referred to as TDMA (Time division multiple access) monitoring method.

Figure 7:
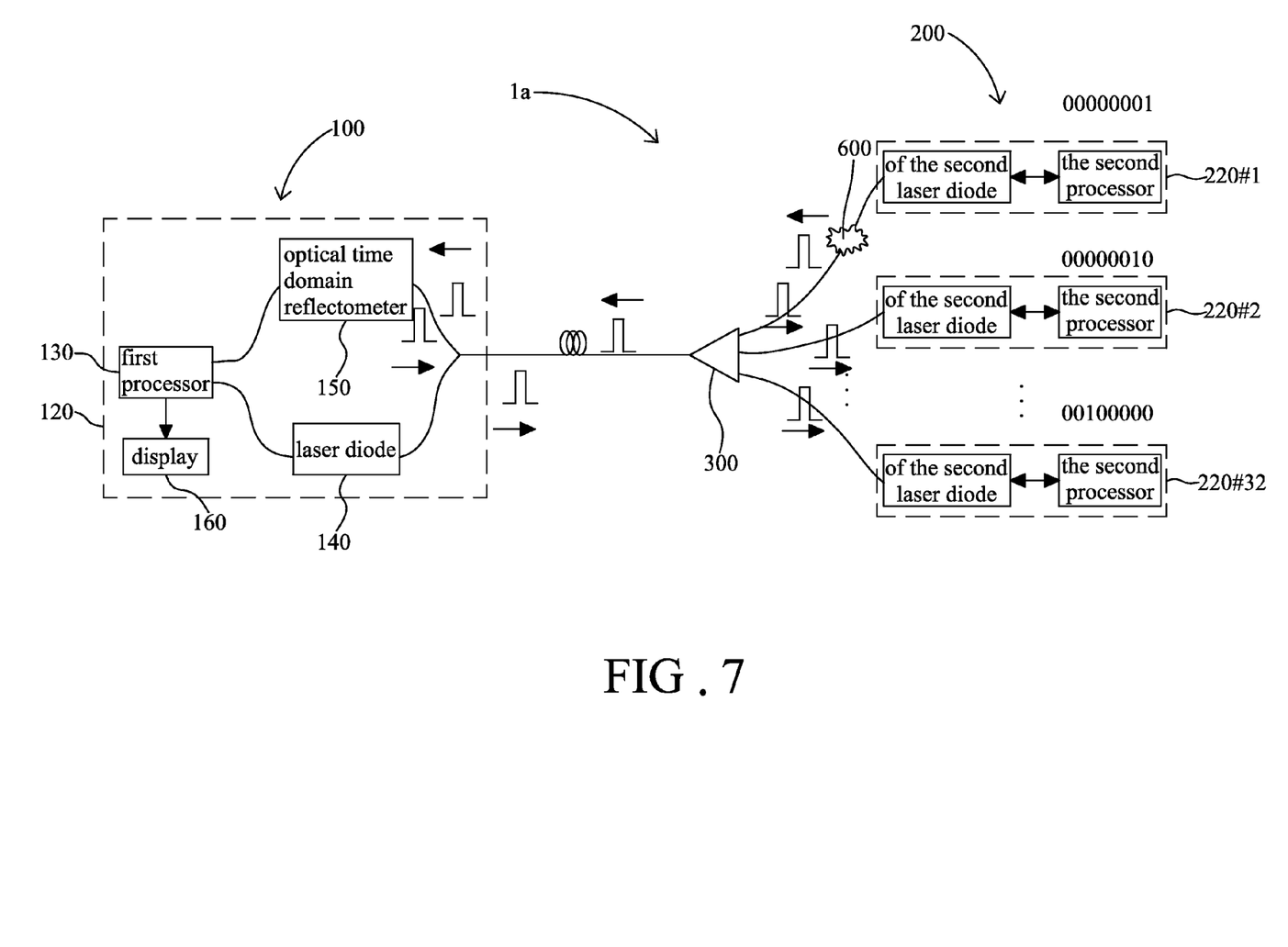
FIG. 7 is the active network breakpoint monitoring method of the present invention.

Refer to FIG. 7, it is the active network monitoring method (S3) of the present invention. The active network monitoring method (S3) provide a active network monitoring system 1a for detecting an abnormality at a position 600, the active network monitoring method (S3) include following steps:

Step (S310): The first processor 130 generates a digital signal and sends the digital signal to the first laser diode 140; the first laser diode 140 modulates the digital signal into an optical signal, and sends the optical is signal to the abnormal position 600 through the optical fiber 400 and optical splitter 300.

Step (S320): The display 160 displays that the active monitoring system 1a has the abnormal position 600 as the communication office 100 confirming that the identification signal transmitted back by the client 200 has not been received.

Step (S330): The first processor 130 sends a control signal to drive the optical time domain reflectometer 150 to transmit an optical pulse signal to the abnormal position 600, and the abnormal position 600 reflects the optical pulse signal to optical time domain reflectometer 150, in order to make the optical time domain reflectometer 150 calculate the abnormal position 600 by the reflected optical pulse signal.

Compared to the active network monitoring system of the present invention 1a and the passive optical network system in the prior art, the active network monitoring system can take advantage of the cheap 8051 single chip (the first processor 130) and the two-way narrowband Fabry-Perot laser diode to replace the high cost optical element of the fiber brag grating filter, the optical circulator, and the tunable laser light source, etc., thereby substantially reducing costs. In the active network monitoring method (S1), (S2) and (S3), using the cheap 8051 single chip and two-way narrowband Fabry-Perot laser diode to achieve the two-way active monitoring results between the communication office 100 and the client 200. The optical time domain reflectometer in the prior art is a passive mechanism, but the active network monitoring method (S3) in present invention use the 8051 single chip to make optical time domain reflectometer achieve the purpose of actively monitor the abnormality at a position in the optical fiber.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An active network monitoring method for detecting an abnormality at a position between an optical line terminal of a communication office and an optical network unit of a client, the active network monitoring method comprising the following steps:

disposing a first monitoring module at the communication office and a second monitoring module at the client, wherein the first monitoring module has a first processor, a first laser diode and an optical time domain reflectometer, the second monitoring module has a second processor and a second laser diode;
   providing an optical splitter having a receiving end and a transmitting end, wherein the receiving end is connected to the first monitoring module, and the transmitting end is connected to the second monitoring module;
   the first processor generating a digital signal and sending the digital signal to the first laser diode, wherein the digital signal comprises a plurality of bits with an order for a plurality of identification numbers;
   the first laser diode modulating the digital signal into a first optical signal and sending the first optical signal to the second monitoring module via the optical splitter;
   the second laser diode receiving the first optical signal and converting the first optical signal back to the digital signal, and then sending the digital signal to the second processor;
   the second processor performing a bitwise negation operation on each of the bits of the digital signal to produce an identification signal of the client, and sending the identification signal through the second laser diode to the communication office according to the order for the identification numbers;
   the first monitoring module at the communication office judging whether the identification signal from the second laser diode is received or not;
   if the first monitoring module at the communication office confirming that the identification signal from the second laser diode is not received, judging there is an abnormal position between the first monitoring module and the second monitoring module;
   the first processor sending a control signal to drive the optical time domain reflectometer to generate and transmit an optical pulse signal to the abnormal position, wherein the optical pulse signal has a wavelength in the range between 1600 nm and 1650 nm; and
   the optical time domain reflectometer calculating the abnormal position by the reflected optical pulse signal from the abnormal position.

2. The active network monitoring method of claim 1, further comprising the step:
   the second laser diode modulating a plurality of identification signals into a plurality of second optical signals and transmitting the second optical signals to the communication office, wherein there is a time interval between one and the previous one of the second optical signals, and the plurality of the time intervals are the same.

3. The active network monitoring method of claim 1, further comprising the step:
   providing a plurality of second monitoring modules; and
   the first monitoring module monitoring on each of the second monitoring modules in turns.

4. The active network monitoring method of claim 1, further comprising:
   disposing a display in the first monitoring module; and
   the display displaying the abnormal position when the first monitoring module at the communication office confirming that the identification signal from the second laser diode is not received.

5. The active network monitoring method of claim 4, wherein the first optical signal and the second optical signals each have a wavelength in a range between 1600 nm and 1650 nm.

* * * * *